United States Patent [19]

Balbo et al.

[11] Patent Number: 5,608,180
[45] Date of Patent: Mar. 4, 1997

[54] MANEUVERING DEVICE FOR THE RECOILING MASS OF A PIECE OF ARTILLERY

[75] Inventors: Patrick Balbo; Philippe Grelat, both of Bourges; Guy Malassenet, Pigny; Fabienne Mandereau, Sainte Thorette, all of France

[73] Assignee: Giat Industries, Versailles Cedex, France

[21] Appl. No.: 439,385

[22] Filed: May 11, 1995

[51] Int. Cl.$^6$ .............................. F41A 25/04; F41A 25/26
[52] U.S. Cl. ........................................... 89/43.01; 89/198
[58] Field of Search ........................ 89/43.01, 42.01, 89/198, 177

[56] References Cited

U.S. PATENT DOCUMENTS

| | | | |
|---|---|---|---|
| 378,333 | 2/1888 | Noble | 89/43.01 |
| 384,942 | 6/1888 | Tonns | 89/43.01 |
| 1,447,087 | 2/1923 | Joyce | 89/43.01 |
| 2,408,680 | 10/1946 | Pontius | 277/7 |
| 2,920,536 | 1/1960 | Maillard | 89/198 |
| 3,538,811 | 11/1970 | Poole | 89/198 |
| 3,636,813 | 1/1972 | Wiemers | 89/43.01 |
| 3,745,880 | 7/1973 | Metz et al. | 89/43.01 |

FOREIGN PATENT DOCUMENTS

| | | | |
|---|---|---|---|
| 2380532 | 8/1978 | France . | |
| 308467 | 10/1920 | Germany | 89/43.01 |
| 551831 | 6/1932 | Germany | 89/43.01 |
| 1948613 | 4/1971 | Germany . | |
| 3345768A1 | 6/1985 | Germany . | |

*Primary Examiner*—Stephen M. Johnson
*Attorney, Agent, or Firm*—Oliff & Berridge

[57] ABSTRACT

A maneuvering device for a recoiling mass of a piece of artillery. The maneuvering device includes first and second ends that are attachable, respectively, to a recoiling mass and a cradle of the piece of artillery. The present invention is applied to the inspection of correct functioning of the recoil mechanism of a large or medium caliber piece of artillery during the counter-recoil of the recoiling mass.

18 Claims, 8 Drawing Sheets

MANEUVERING DEVICE FOR THE RECOILING MASS OF A PIECE OF ARTILLERY

BACKGROUND OF THE INVENTION

The scope of the present invention relates to a maneuvering device for the recoiling mass of a piece of artillery.

The propelling charge of a munition, when a round is fired, transmits to the projectile and the piece of artillery an impetus in the opposite direction resulting in the ballistic trajectory of the projectile and the recoil of the recoiling mass. This recoil is controlled by a recoil mechanism linking the recoiling mass to a fixed cradle that absorbs the kinetic energy from the recoil and causes the immediate counter-recoil to enable another round to be fired. It is therefore paramount to check that the recoil mechanism functions perfectly when the piece is manufactured, undergoes maintenance and before each firing sequence.

To maneuver the recoiling mass of a piece of artillery, several methods are used according to the assembly configuration of the artillery. If the artillery is mounted on a top-carriage, a cable winch is used, the ends of which are fixed on either side of the recoiling mass on a fixed part of the top-carriage, the cable passing over a pulley fitted on the end of the barrel.

If the artillery is mounted onto a vehicle having a turret, a cable winch is used, the ends of which are fixed on each side of the recoiling mass on the outside of the turret, the cable passing over a pulley fitted on the end of the barrel. The vehicle may also be maneuvered, for example, a tank that brings the muzzle of the barrel to bear on an obstacle that is sufficiently rigid and continues to move forward to create relative movement between the recoiling mass and the fixed part of the artillery.

In all cases currently known, the system used to maneuver the recoiling mechanisms, when the artillery has been integrated with its base, is a generally static system that only allows for low-speed recoil and counter-recoil. Only those systems using cables to some extent allow a counter-recoil at actual speed to be obtained by deblocking retention of the cable on the winch. However, this operation is dangerous given the tension exerted on the cable and the risk of whiplash when the cable is deblocked.

SUMMARY OF THE INVENTION

An aim of the present invention is consequently to propose a maneuvering device for the recoiling mass of a piece of artillery that ensures proper function of the recoiling mechanism and notably the recuperators and mechanisms that are set into motion during pilot commanded and/or automatic counter-recoil operations.

A further aim of the present invention is to propose such a maneuvering device operating under maximum safety conditions.

A further aim of the present invention is to propose a maneuvering device for the recoiling mass that is easy to implement.

A further aim of the present invention is to propose a maneuvering device for the recoiling mass that is both reliable and simple to construct.

These aims are reached compressing the recoil mechanism by using a jack according to the present invention.

In a first embodiment, the jack being a double-action jack, the counter-recoil is commanded by the jack.

In a second advantageous embodiment, the counter-recoil is carried out automatically through freeing one of the fastening points of the jack at the end of its stroke thus freeing the recoil mechanism.

In a third, particularly advantageous embodiment, the counter-recoil may be either commanded or automatic as chosen. For example, first the operation of the recoil mechanism is checked by operating a counter-recoil at low-speed commanded by a jack and thereafter a trial nearer to real firing operation conditions is carried out by freeing the fastening point of the jack at the end of the compression stroke of the recoil mechanism.

The subject of the invention includes a maneuvering device for the recoiling mass of a piece of artillery linked by a recoil mechanism to a cradle, characterised in that it comprises in addition a jack working in traction and whereof a first end comprises structure for fastening on the cradle and a second end comprises structure for fastening on the recoiling mass.

A further subject of the invention is a device, characterised in that the jack is a double-action hydraulic jack.

A further subject of the invention is a device, characterised in that the fastening structure of the recoiling mass may be disconnected thereby allowing the second end of the jack to be uncoupled from the recoiling mass.

A further subject of the invention is a device, characterised in that it comprises retention means for the second end of the jack mounted in rotation with respect to an axle that is perpendicular to the rod of the jack comprising a protuberance that is not centered with respect to the axle and in that the body of the jack comprises an uncoupling head fitted with a protuberance that is not centered with respect to the rod and bearing, at the end of the stroke, on the protuberance of retention structure and ensuring its swing around the axle thereby freeing the end of the jack rod.

A further subject of the invention is a device, characterised in that the retention structure comprises two half-shells mounted in rotation in a cradle and generally symmetrical with respect to a perpendicular plane to the rotational axle passing through the center of the cradle.

A further subject of the invention is a device, characterised in that it comprises locking structure in a hooked position to the retention structure.

A further subject of the invention is a device, characterised in that it comprises a lock comprising at least one hasp that in its locked position, simultaneously penetrates in a slot arranged on an outer face of the cradle and in a slot arranged in the rotational axle of the retention structure.

A further subject of the invention is a device, characterised in that the end of the jack rod opposite the body of the jack comprises a perpendicular axle to the jack rod.

A further subject of the invention is a device, characterised in that it comprises a pump connected to the jack allowing the pressure in the cylinder of the jack to be increased and a valve allowing the pressure in the cylinder of the jack to be decreased to order.

A further subject of the invention is a piece of artillery, notably medium or large caliber, comprising a recoiling mass and a fixed element, notably a cradle, characterised in that it comprises a device according to the invention linking the fixed element to the recoiling mass.

BRIEF DESCRIPTION OF THE DRAWINGS

The invention will be made clearer by way of the following description and the appended drawings given by way of illustration, non-exhaustively, and wherein.

DETAILED DESCRIPTION OF PREFERRED EMBODIMENTS

In FIGS. 1 to 8, the same references have been used to designate the same elements.

Figure 1:
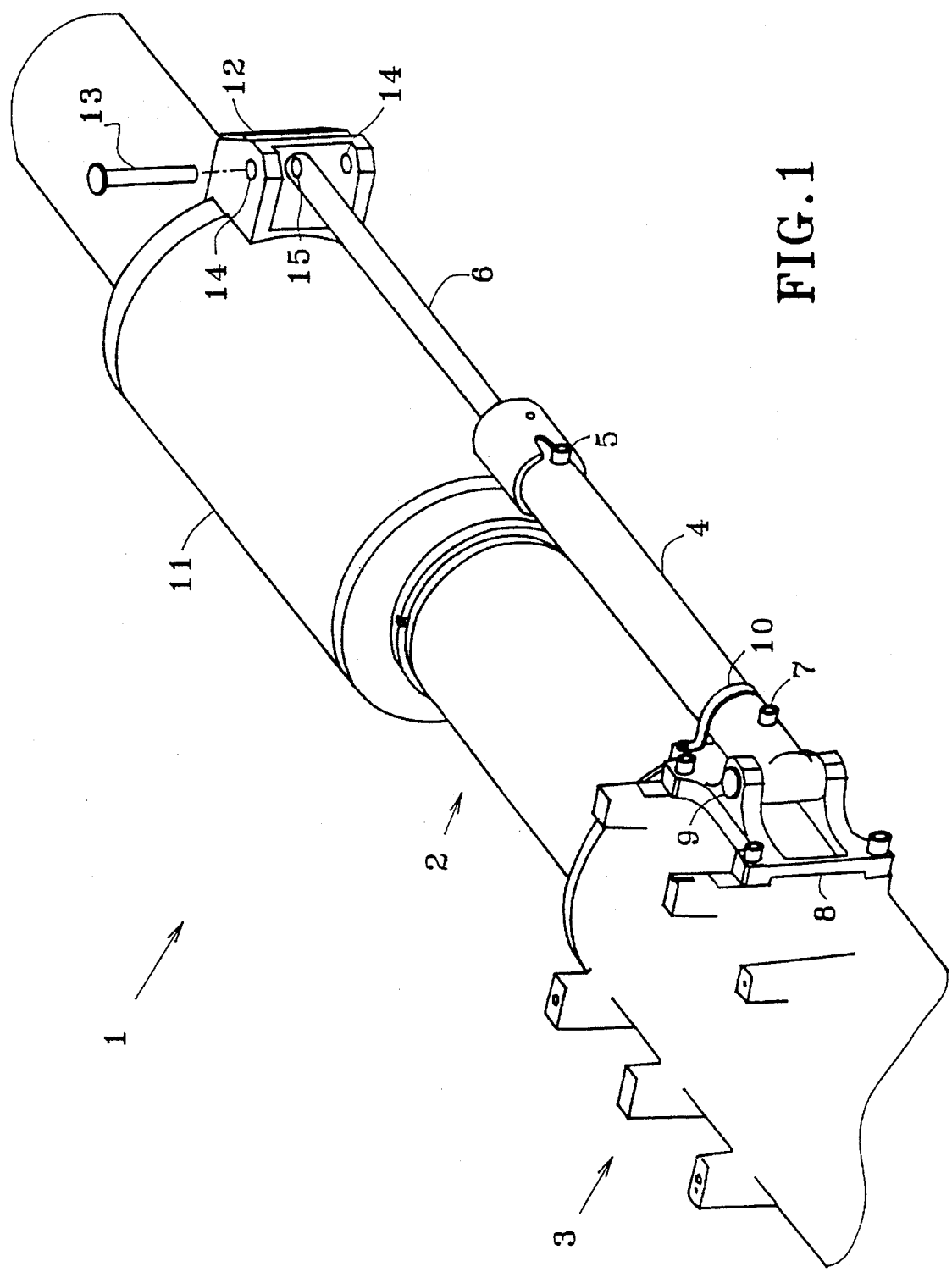
FIG. 1 is a perspective view of a first embodiment of the device according to the present invention.

FIG. 1 shows a cannon 1 comprising a recoiling mass 2 and a cradle 3 linked by a recoil mechanism (not shown) as well as a jack 4. The jack with advantage, is a double-action hydraulic jack comprising a first supply opening 5 for pressure oil ensuring the withdrawal of a rod 6 and an opening 7 ensuring the exit of the rod 6. The openings 5 and 7 are, with advantage, fitted with quick release couplings enabling them to be connected to a pump, preferably motorized, for example, electric, usable, for example, in a workshop, or connected to a hand pump or to a valve. A first end of the jack, the body bearing the cylinder in the example shown, is fastened on the cradle 3, on a fixed part of the artillery or on the turret, for example by means of a fork joint 8, of a quick-dismount axle 9 advantageously completed by a collar 10 that reduces lateral movements of the jack 4. The end of the rod 6 of the jack 4 opposite to the body is made integral with an element of the recoiling mass 2, notably with the fume extractor 11 by means of a fork joint, or a cradle 12 and a quick-dismount axle 13 passing through slots 14 arranged in the cradle 12 and by a slot 15 arranged on the end of the rod 6 of the jack 4.

The device shown in FIG. 1 enables a pilot-commanded counter-recoil maneuver of the recoiling mass 2 of the cannon 1 to be carried out. First of all, the jack 4 is fastened to the fork joint 8 by means of the axle 9 and to the cradle 12 by means of the axle 13. According to a first mode of operation, the pump is connected to the opening 5, the opening 7 of the jack 4 being put to the tank, that is to say, the oil running from the opening 7 is collected in a recipient at ambient pressure. The recuperators of the recoil mechanism are pressured. The recoiling mass is maneuvered into recoil by the action of the pump and the jack 4.

When the required recoil has been reached, the pump is cut and the pressure in the cylinder of the jack 4 is controlled by means of a valve connected to the opening 5. The recuperator of the recoil mechanism ensures the counter-recoil of the recoiling mass.

According to a second mode of operation of the device shown in FIG. 1, the recuperators are not pressured and the counter-recoil maneuver is ensured by connecting the pump to the opening 7, the opening 5 being put to the tank. The jack 4 is dismounted by removing the quick-dismount axles 9 and 13 and, possibly, the collar 10 in order to fire a round of several rounds.

A particularly advantageous embodiment of the device according to the invention is shown in Figure. The device comprises on one of the ends of the jack 4, the end of the rod in the example shown, fastening means that may be freed at the end of the stroke. The end of the rod 6 of the jack 4 comprises a shoulder, or advantageously, as shown in FIG. 3, a transverse axle 16 perpendicular to the rod 6. In the advantageous example shown in FIGS. 2 to 8, the cradle 12 is fitted with retention means 17 swinging around an axle 18, merging in its hooked position with the axle 16 of the end of the rod 6 of the jack 4. Advantageously, the swinging of the retention means 17 and, consequently, the freeing of the end of the rod 6 are controlled mechanically at the end of the course of recoil. For example, the body of the jack 4 comprises at its end from which the rod 6 emerges an uncoupling head 19 comprising a protuberance 20 coming to bear at a distance d spaced from the axle 18 at the end of recoil, on a protuberance 21 of the retention means 17 and ensuring their swing around the axle 18.

The protuberance 21 of the retention means 17 of the end of the rod 6 of the jack 4 comprises, for example, a flat part facing towards the protuberance 20 of the uncoupling head 19.

In the advantageous example shown, the retention means 17 comprises two elements 17.1 and 17.2 that are symmetrical with respect to a plane perpendicular to the axle 18 and pass through the middle of the cradle 12. The elements 17.1 and 17.2 are for example joined together by a screw 22. The retention means 17 comprises a rounded cut-out part 23 that allows the rod 6 to penetrate the cradle 12 and the receptacle cavities 24 of the axle 16. The elements 17.1 and 17.2 comprise respectively axles 25.1 and 25.2 penetrating in the slots 14 of the cradle 12.

The cradle 12 is, with advantage, fitted with means to exert a righting torque towards the closed position on the retention means 17. The means 26 comprises, for example, a spiral spring whereof a first end 27 penetrates a slot 28 arranged in the cradle 12 and a second end 29 penetrates in an out-of-center slot 30 arranged on the axle 25.2 of the element 17.2 of the retention means 17. In the advantageous example shown, the spring 26 is held in place by means of a washer 31 and a screw 32 penetrating in a tapping 33 arranged in the axle 25.2 of the element 17.2 of the retention means 17.

Figure 2:
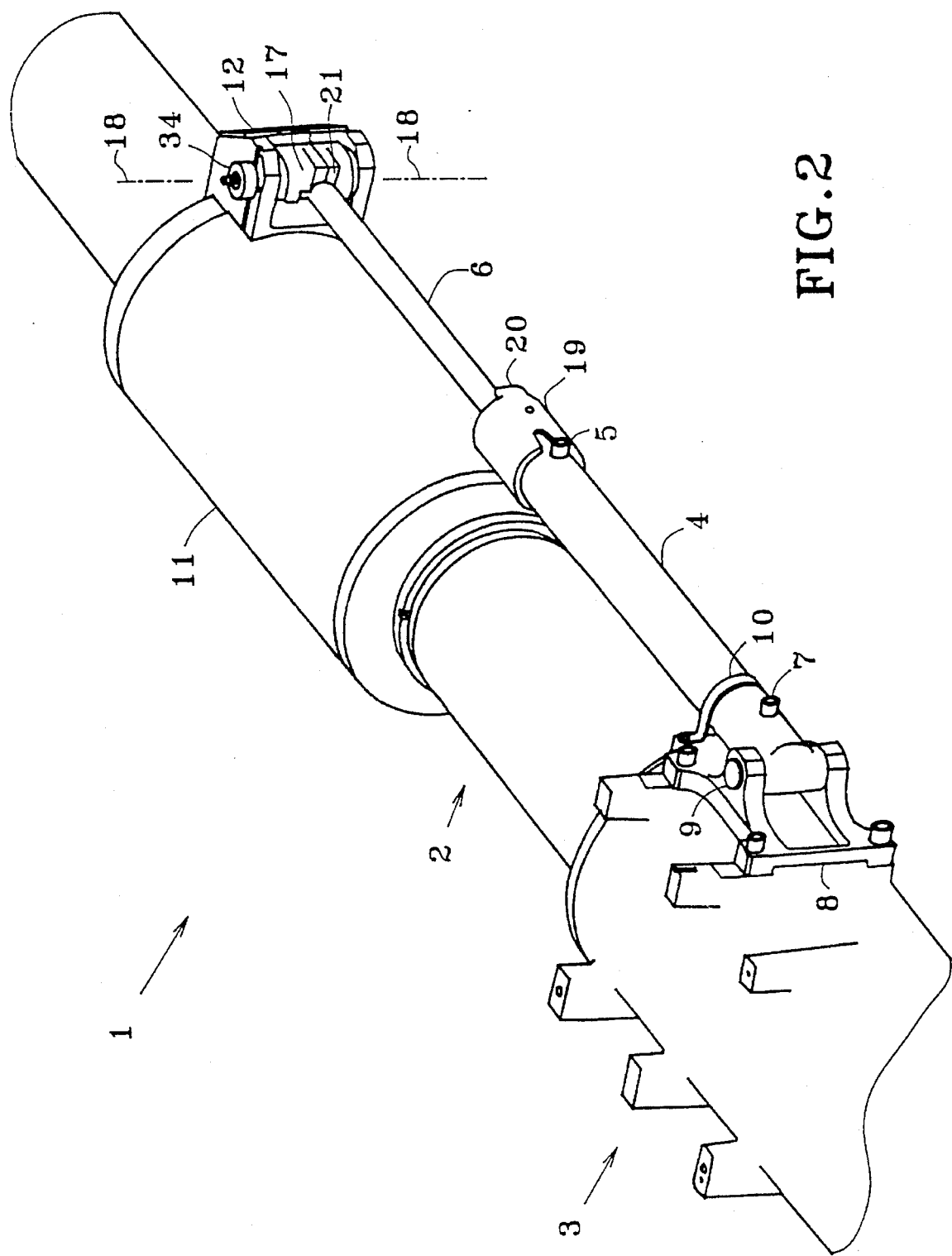
FIG. 2 is a perspective view of a second embodiment of the device according to the present invention.
Figure 3:
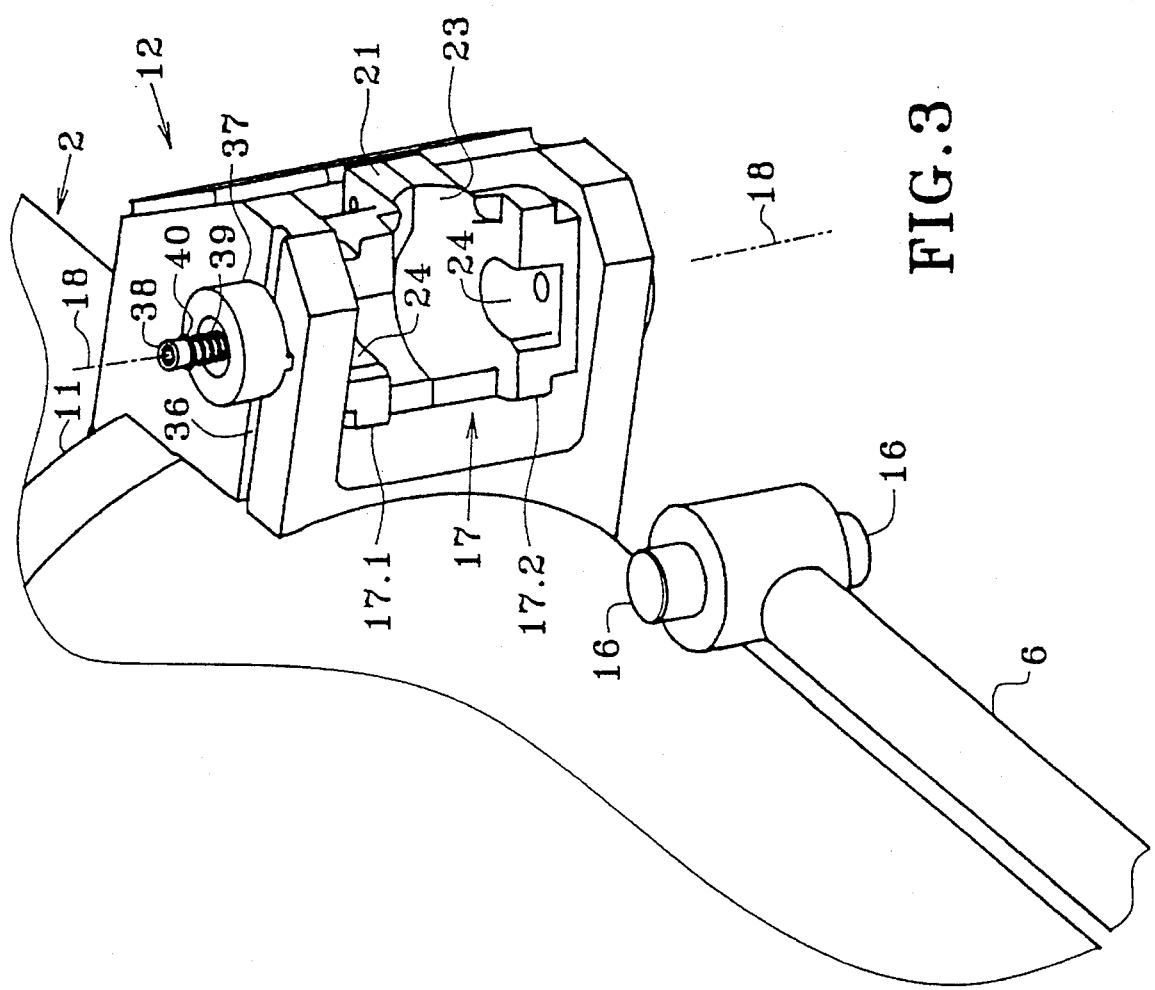
FIG. 3 is a perspective view illustrating the hooking of the jack axle on a fastening point implemented in the device according to the present invention.
Figure 4:
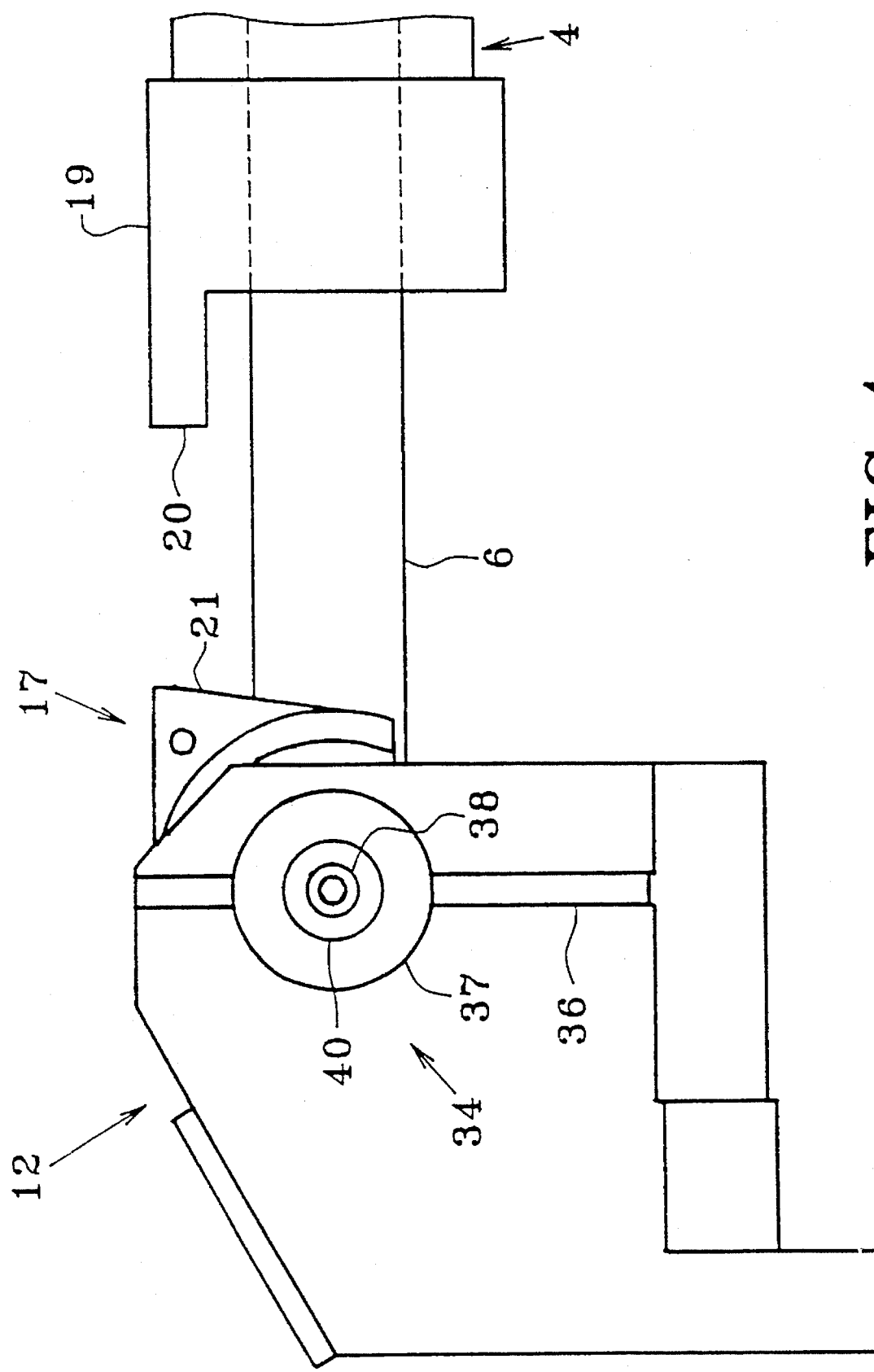
FIG. 4 is a side view showing the freeing of the jack axle.
Figure 5:
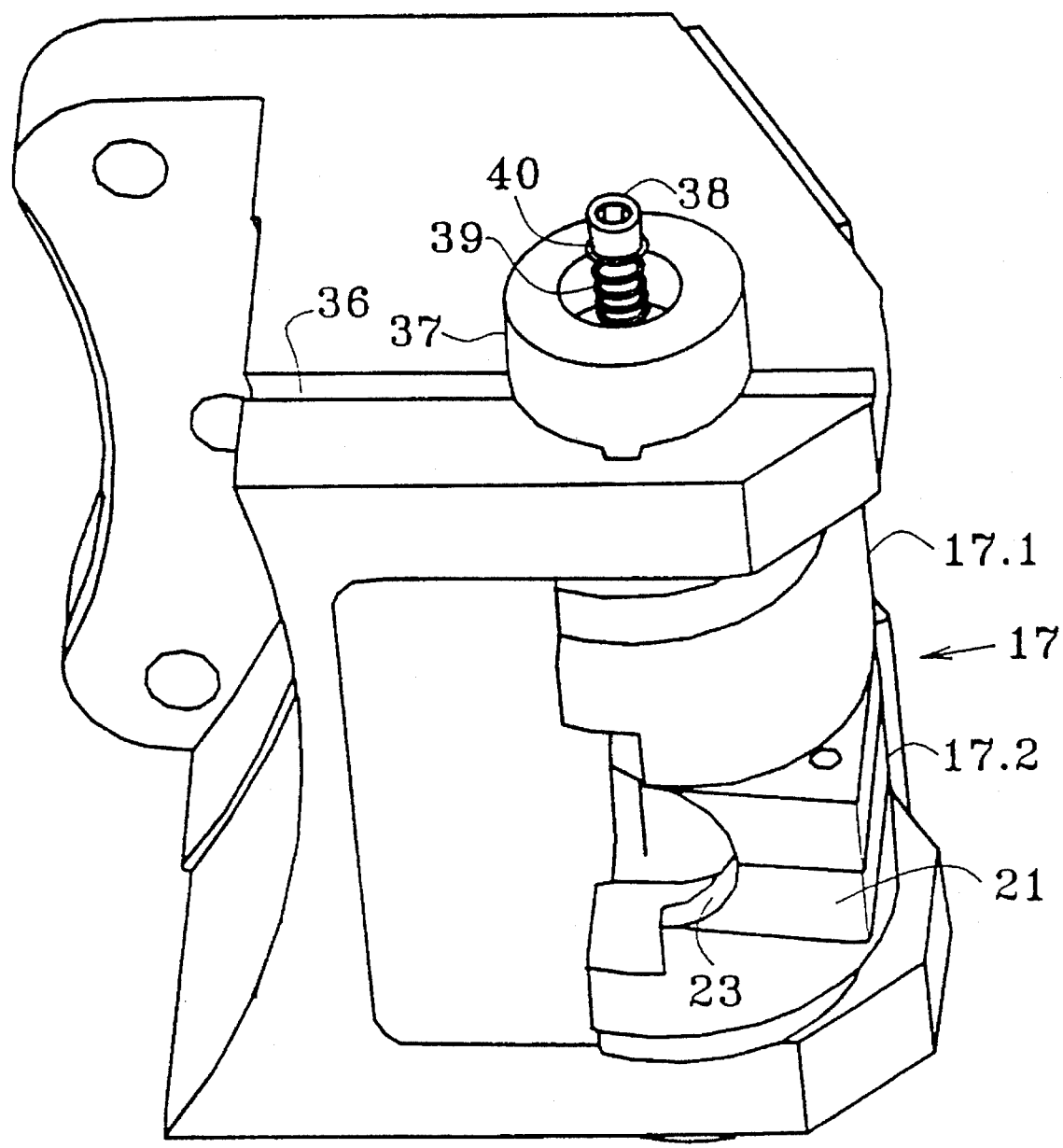
FIG. 5 is a perspective view of a preferred embodiment of a fastening device that may be freed from the jack axle.
Figure 6:
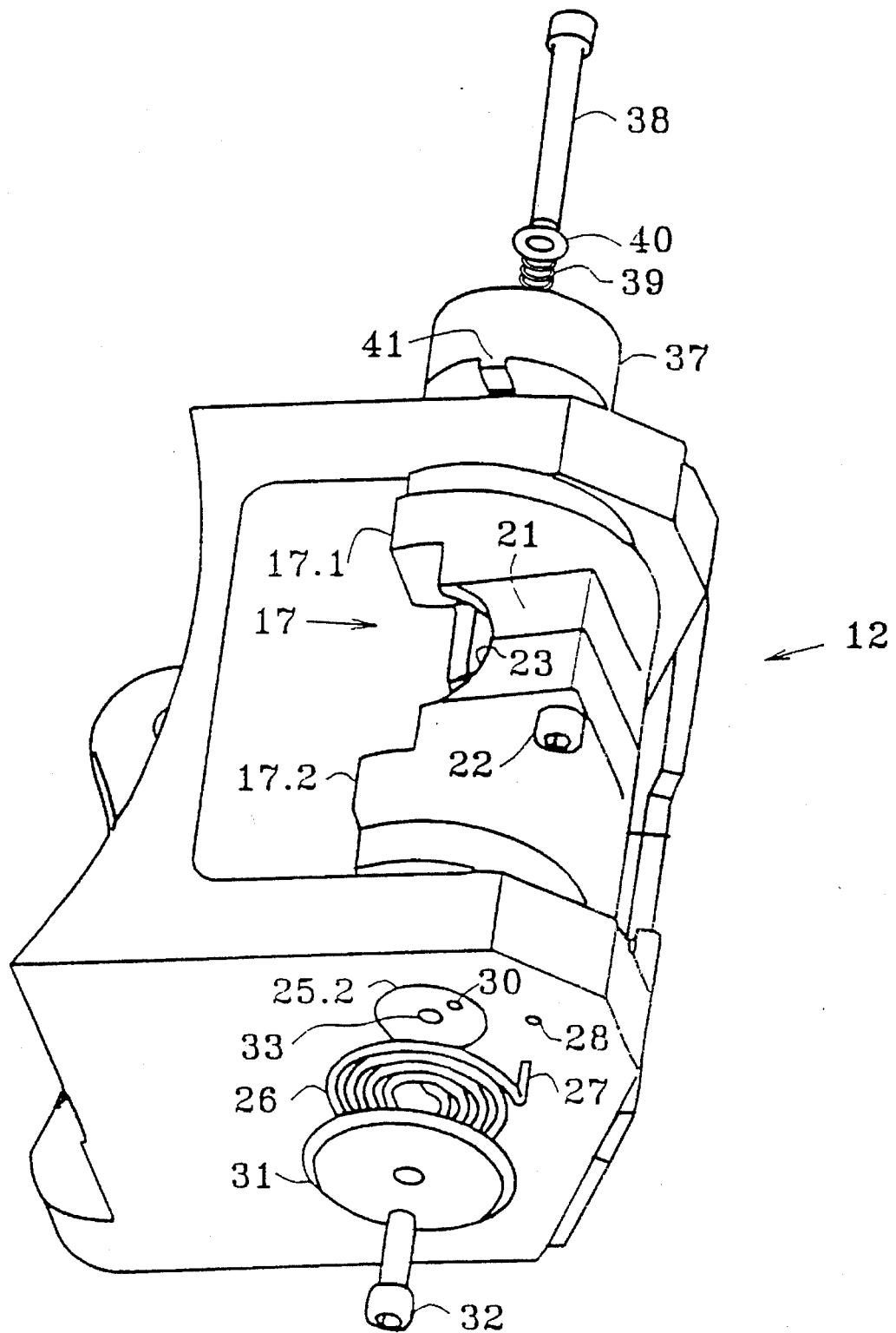
FIG. 6 is a perspective view of the device in FIG. 5, partially taken apart.
Figure 7:
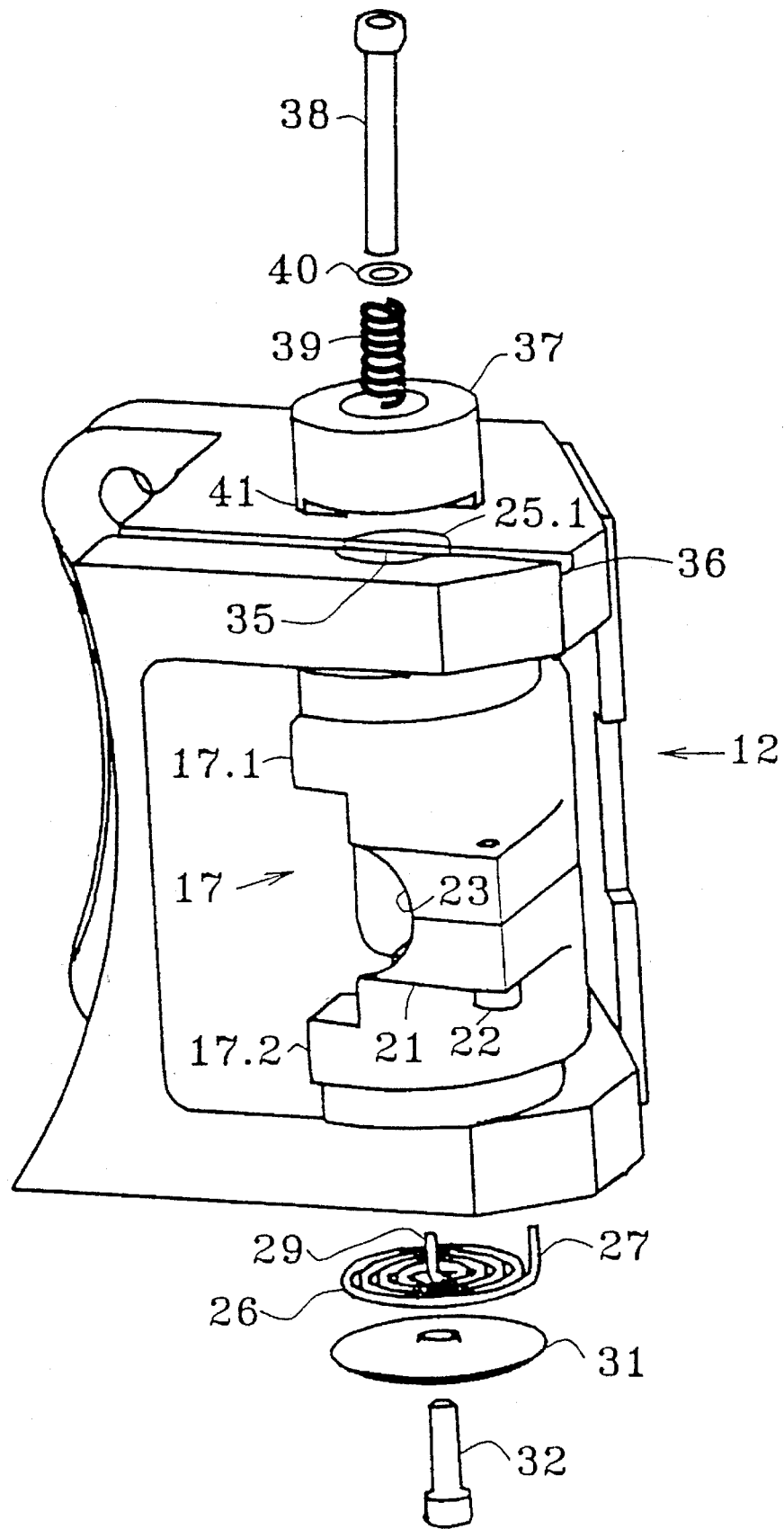
FIG. 7 is another perspective view of the device in FIG. 5, partially taken apart.
Figure 8:
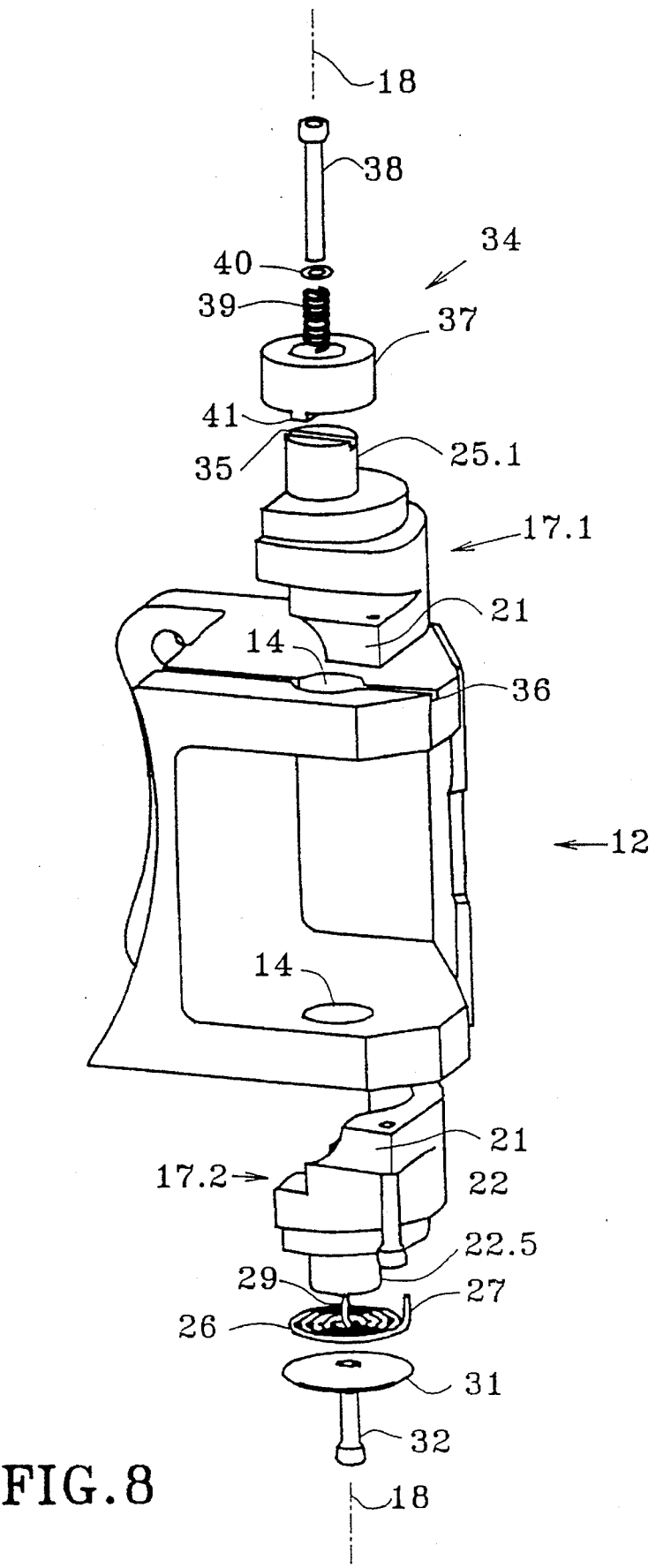
FIG. 8 is a perspective view of the device in FIG. 5, entirely disassembled.

In a first alternative embodiment, the device shown in FIG. 2 only ensures the automatic positioning of the recoiling mass 2 of the cannon 1. In such a case, a single-action jack 4 working in traction may advantageously be used.

The device shown in FIG. 2, with advantage, allows the choice between automatic or pilot-commanded counter-recoil. In the advantageous example shown, the device comprises locking means 34, in the closed position, the retention means 17 of the axle 16 corresponding to the hooked position of the rod 6. In the advantageous example shown, the axle 25.1 of the element 17.1 comprises a slot 35 and the outer face of the cradle 12 receiving the element 17.1 comprises a slot 36. In the closed position, the retention means 17 and the slots 35 and 36 are in alignment. A lock 37 fastened by a screw 38 screwed in a tapping (not shown) of the axle 25.1 is held in place by a spring 39, and a washer 40 comprises one, or with advantage two, hasps 41 that, in the locked position, simultaneously penetrate in the slots 35 and 36 (FIG. 7) and, in an unlocked position (FIGS. 2, 3, 5, 6 and 8) are turned for example at a 90° angle with respect to the slots 35 and 36 and rest on the outer face of the cradle 12.

After having assembled the device according to the invention on the artillery, the coupling may be carried out by hydraulically making the rod 6 of the jack 4 come out until the axle 16 fitted on it penetrates into the cavities 24 of the retention means 17 that have previously been turned at an angle of approximately 90° and held in this position manually during the hooking phase. Once the axle 16 is in position in the cavities 24, the retention means 17 is released, which, thanks to the spring 26, moves into its hooked position. In a first mode of operation with automatic counter-recoil of the recoiling mass 2, the hasps 41 of the lock 37 are positioned perpendicularly to the slots 35 and 36. The pump is connected to the opening 5, the opening 7 being put to the tank. The pump is switched on and the recoiling mass 2 is recoiled until the protuberance 20 of the uncoupling head 19 of the jack 4 comes to bear upon the protuberance 21 of the retention means 17 that apart from the righting torque of the spring 26, is free to turn around the axle 18. Given the off-set of the protuberances 20 and 21 with respect to the axle 18, the pressure build-up in the jack 4 by means of the pump being supplied via opening 5 makes the retention means 17 swivel until the position of the cavities 24 allows the axle 16 to slip free. At this precise moment, the strain exerted by the recuperators of the recoil mechanism take over and freely bring the recoiling mass 2 back into position. The collar 10 reduces the lateral clearance of the jack when the axle 16 is being freed. The operation may be renewed after lowering the oil pressure by the opening 5 of the jack 4, after the end of the rod 6 of the jack 4 bearing the axle 16 has been rehooked in the retention means 17.

According to a second embodiment, after hooking the end of the rod 6 of the jack 4 in the retention means 17, the locks 37 are turned at a 90° angle, which enables the spring 39 to make the hasps 41 penetrate simultaneously into the slots 35 and 36, thereby ensuring that the retention means 17 is locked. In this position, the device shown in FIG. 2 enables a pilot-commanded counter-recoil maneuver to be carried out, which is similar to the operation of the device in FIG. 1.

The present invention is applied, for example, to the inspection of the correct functioning of a piece of artillery during recoil.

The present invention is applied mainly to the inspection of the correct functioning of the recoil mechanism of a large or medium caliber piece of artillery during the counter-recoil of the recoiling mass.

We claim:

1. A maneuvering device for maneuvering a recoiling mass of a piece of artillery, said recoiling mass being linked to a cradle of said piece of artillery, said device comprising a jack for linking the recoiling mass and the cradle, a first end of the jack comprising first means for fastening the first end of the jack to the cradle, and a second end of the jack comprising second means for fastening the second end of the jack to the recoiling mass, said recoiling mass moving in a compression stroke having an end; said second means including a disconnectable coupling, thereby allowing the second end of the jack to be uncoupled from the recoiling mass at said end of said compression stroke by an action of said piece of artillery during said compression stroke.

2. A device according to claim 1, wherein the jack is a double-action hydraulic jack.

3. A maneuvering device for maneuvering a recoiling mass of a piece of artillery, said recoiling mass being linked to a cradle of said piece of artillery, said device comprising a jack for linking the recoiling mass and the cradle, a first end of the jack comprising first means for fastening the first end of the jack to the cradle, and a second end of the jack comprising second means for fastening the second end of the jack to the recoiling mass, wherein the jack includes a rod that slides within a body of said jack, the device further comprising retention means for retaining the second end of the jack mounted in rotation with respect to an axle that is perpendicular to the rod of the jack, said retention means comprising a first protuberance that is not centered with respect to the axle, and wherein the body of the jack further comprises an uncoupling head provided with a second protuberance that is not centered with respect to the rod, said second protuberance being engageable with the first protuberance of the retention means to ensure rotation of the first protuberance about the axle, thereby freeing the end of the rod of the jack from the recoiling mass.

4. A device according to claim 3, wherein the jack is a double-action hydraulic jack.

5. A device according to claim 3, wherein the retention means comprises two half-shells mounted in rotation in a cradle, each of said half-shells being substantially symmetrical with respect to a perpendicular plane passing through a center of the cradle.

6. A device according to claim 3, further comprising locking means for locking the retention means in a closed position.

7. A device according to claim 6, wherein the locking means comprises a lock having at least one hasp that, in its locked position, simultaneously penetrates in a slot arranged on an outer face of the cradle and penetrates in a slot arranged in a rotational axle of the retention means.

8. A device according to claim 3, wherein an end of the rod of the jack remote from the body of the jack comprises an axle perpendicular to the rod of the jack.

9. A device according to claim 3, further comprising a pump connected to the jack allowing pressure in the jack to be increased and a valve allowing the pressure in the jack to be selectively decreased.

10. A piece of artillery comprising:

a recoiling mass;

a fixed element; and a jack for coupling the recoiling mass and the fixed element, a first end of the jack comprising first means for fastening the first end of the jack to the fixed element, and a second end of the jack comprising second means for fastening the second end of the jack to the recoiling mass said recoiling mass moving in a compression stroke having an end; said second means including a disconnectable coupling, thereby allowing the second end of the jack to be uncoupled from the recoiling mass at said end of said compression stroke by an action of said piece of artillery during said compression stroke.

11. A device according to claim 10, wherein the jack is a double-action hydraulic jack.

12. A piece of artillery comprising:

a recoiling mass;

a fixed element; and a lack for coupling the recoiling mass and the fixed element, a first end of the jack comprising first means for fastening the first end of the jack to the fixed element, and a second end of the jack comprising second means for fastening the second end of the jack to the recoiling mass wherein the jack includes a rod that slides within a body of said jack, the device further comprising retention means for retaining the second end of the jack mounted in rotation with respect to an axle that is perpendicular to the rod of the jack, said retention means comprising a first protuberance that is not centered with respect to the axle, and wherein the body of the jack further comprises an uncoupling head provided with a second protuberance that is not centered with respect to the rod, said second protuberance being engageable with the first protuberance of the retention means to ensure rotation of the first protuberance about the axle, thereby freeing the end of the rod of the jack from the recoiling mass.

13. A device according to claim 12, wherein the jack is a double-action hydraulic jack.

14. A device according to claim 12 wherein the retention means comprises two half-shells mounted in rotation in a cradle, each of said half-shells being substantially symmetrical with respect to a perpendicular plane passing through a center of the cradle.

15. A device according to claim 12, further comprising locking means for locking the retention means in a closed position.

16. A device according to claim 15, wherein the locking means comprises a lock having at least one hasp that, in its locked position, simultaneously penetrates in a slot arranged on an outer face of the cradle and penetrates in a slot arranged in a rotational axle of the retention means.

17. A device according to claim 12, wherein an end of the rod of the jack remote from the body of the jack comprises an axle perpendicular to the rod of the jack.

18. A device according to claim 12, further comprising a pump connected to the jack allowing pressure in the jack to be increased and a valve allowing the pressure in the jack to be selectively decreased.

* * * * *